United States Patent [19]

Voegele

[11] Patent Number: 4,934,718
[45] Date of Patent: Jun. 19, 1990

[54] MULTI-PURPOSE HAND TRUCK

[76] Inventor: Wolfgang Voegele, Zeppelinstrasse 12, 7992 Tettnang, Fed. Rep. of Germany

[21] Appl. No.: 225,419

[22] Filed: Jul. 28, 1988

[30] Foreign Application Priority Data

Jul. 29, 1987 [DE] Fed. Rep. of Germany ....... 3725021

[51] Int. Cl.⁵ ............................................... B62B 1/12
[52] U.S. Cl. ......................................... 280/30; 108/12; 108/18; 280/47.18; 280/47.19; 280/47.29; 280/641; 280/649; 280/654
[58] Field of Search ............... 280/47.18, 47.19, 47.29, 280/30, 649, 654, 641; 108/12, 18, 19, 120, 118, 119

[56] References Cited

U.S. PATENT DOCUMENTS

| 1,081,221 | 12/1913 | Durkin | 280/641 |
| 3,082,016 | 3/1963 | Pratt | 280/641 |
| 3,147,748 | 9/1964 | Frank | 280/654 |
| 3,430,972 | 3/1969 | Fiedler | 280/30 |
| 4,284,286 | 8/1981 | Lewallen | 280/654 |
| 4,565,382 | 1/1986 | Sherman | 108/18 |

FOREIGN PATENT DOCUMENTS 3419685 11/1984 Fed. Rep. of Germany .
866536 4/1961 United Kingdom ................. 108/18

Primary Examiner—Charles A. Marmor
Assistant Examiner—Eric Culbreth
Attorney, Agent, or Firm—Saidman, Sterne, Kessler & Goldstein

[57] ABSTRACT

A multi-purpose hand truck having an elongated frame (1) possessing at one end two wheels (9) as well as toe plate (7) projecting at approximately 90° from the frame, and at the other end possessing a handle arrangement (3); in a further refinement the truck can be converted into a utility table by means of a table top (10) and a support stand (5) which are attached to the frame (1). The table top (10) is on the one hand preferentially pivotably attached to the support stand (5) and on the other hand it pivots and is guided longitudinally in the side members (2) of the frame (1). For this purpose trunnions (14) projecting transversely from the table top (10) engage in grooves (15) on the inner surfaces of the side members (2). When the table top (10) is folded out, the toe plate (7) can be pivoted through the frame (1) into a horizontal position (7″) so that its underside faces upwards.

2 Claims, 2 Drawing Sheets

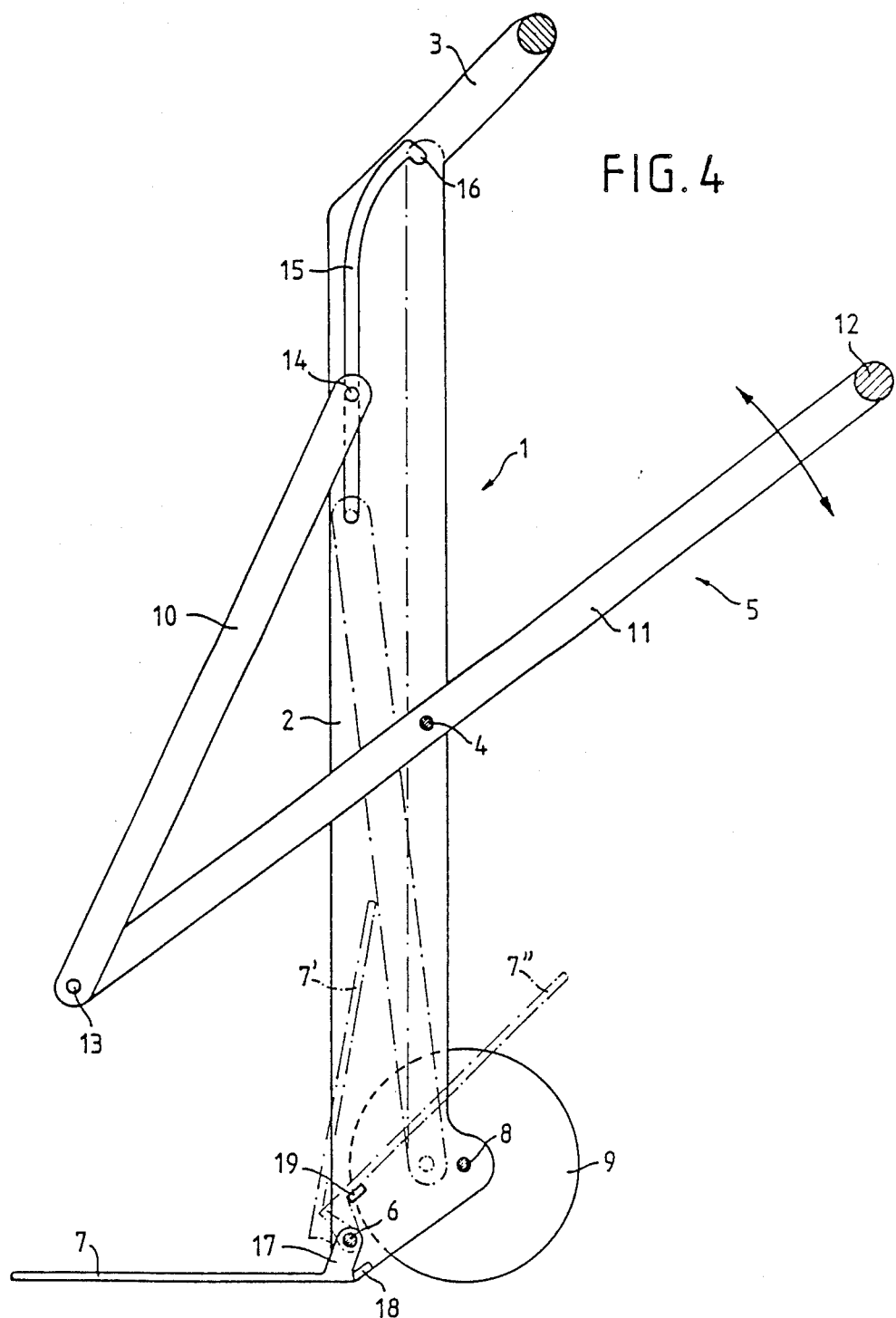

MULTI-PURPOSE HAND TRUCK

The invention relates to a multi-purpose hand truck having an elongated frame consisting of two side members which are joined together, and having at one end two wheels as well as a toe plate arranged at an angle of approximately 90° to the frame, and having also at the other end a handle arrangement.

A multi-purpose hand truck of this type is known from German Offenlegungschrift 34 19 685. It can be shortened for storage by folding the frame together; but also, by pivoting the handle arrangement, by relocating the wheels and by unscrewing and repositioning the toe plate, it can be modified for a number of different transportation tasks. In one of its various modified forms it can be used as a sack truck for transporting sacks, cartons, or other large rectangular objects. It is disadvantageous that this hand truck consists of a large number of parts which can be taken apart only by loosening screws and which must then be screwed together again after they have been assembled in the new configuration.

The purpose of the invention is to propose a multi-purpose hand truck, in particular for work to be performed in private households, in gardens and for hobby purposes, which truck having the form of a sack truck which can be simply and quickly converted in such a manner that it provides at least one working or storage surface arranged at a convenient height.

According to the invention, a multi-purpose hand truck is provided of the type described in the introduction, which is convertible into a utility table by means of a table top and a support stand which are attached to the frame of the truck. Preferably, the table top and the, for example, two-legged or frame-shaped support structure are mounted within the frame, between the two side members, so that these parts do not get in the way when the truck is used for transporting sacks. It should also be possible to fold up the toe plate in order to save space when storing the truck.

One advantageous embodiment of the invention is essentially as follows: The support stand is pivotably mounted about a transverse axis arranged approximately half-way along the frame and it can be moved from a position parallel to the side members to a position where it and the side members are crossed. In this crossed position, the frame which rests on wheels and the supporting stand are held together at the top by the table top. In order to permit the modification to be carried out simply and rapidly, it is proposed that either the table top be pivotably attached to the frame and be connectable to the support stand, or alternatively that the table top be pivotably connected to the support stand and also be connectable to the frame. For this purpose, hooks can be provided on the table top, and these hooks engage in corresponding latching elements on the opposite part.

In a preferred embodiment of the invention, the table top is on the one hand pivotably mounted on the support stand by pivots having axes running parallel to the short sides of the table top, while on the other hand it can pivot in and its longitudinal movement is guided by the side frames. Advantageously, the table top engages with round, sideways-projecting trunnions in grooves provided in the inward-facing surfaces of the side members. In this way, the table top can pivot around the trunnions while the latter move in the grooves. In order to convert the hand truck into a table, all that is necessary is to open out the support stand to an angle of 90°. The frame is then inclined in relation to the table surface and, together with the support stand, which is inclined in the opposite direction and forms a cross with the main frame, it holds the table top firmly in the horizontal position.

The table top should be locked in position together with the frame or support stand. In order also to eliminate having to do the locking by hand, it is proposed that in the upper area of the frame the grooves should run in the direction of the extension of the table top and that their ends should terminate in short downward-angled sections. The trunnions on the table top drop into these downward-angled sections at the ends of the grooves and, when the table top is loaded, the upper sections of the frame and of the support stand cannot move apart.

In a particularly advantageous embodiment of the invention, the toe plate which—as already mentioned—is pivotably mounted in the frame, can be tilted through the frame into a position in which it is parallel to the table top when the latter is in the ready-for-use position. As a result, this creates an additional storage surface for objects which the user wishes to take along when the utility table is moved to another place.

Small rollers can be attached to the bottom ends of the support stand legs. To provide height adjustment or, if needed, to tilt the table, the pivoting axis of the support stand can be optionally positioned relative to the frame or the support stand using, for example, a series of holes provided there. Instead of the table top, it is possible if need be to provide a holding device adapted to certain objects, e.g. a ring from which to hang a bucket or attachments for holding gardening equipment or tools.

Accordingly, the present invention provides a multi-purpose hand truck having an elongated frame comprising two joined side members, and having at one end two wheels as well as a substantially perpendicular toe plate, and having at the other end handle means, characterized in that the hand truck is convertible into a utility table by means of a table top (10) and a support stand (5) which are attached to the frame (1).

An embodiment of the invention will be described below in conjunction with the drawing figures, in which:

FIG. 4 is a longitudinal section through the hand truck shown in FIG. 1, depicted here on a larger scale.

Figure 1:
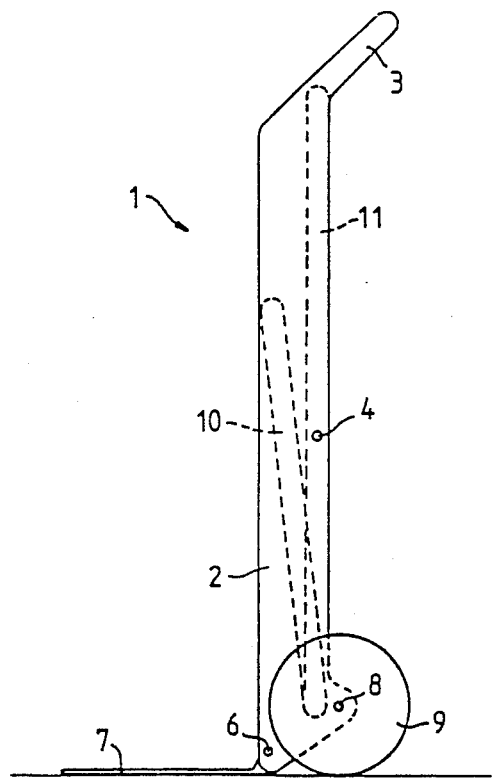
FIG. 1 is a side view of a multi-purpose hand truck set up as a sack truck.
Figure 2:
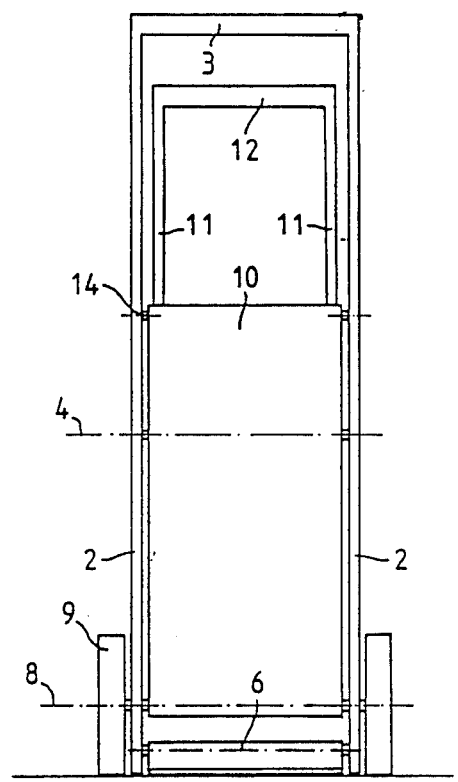
FIG. 2 is a front view of the hand truck shown in FIG. 1.

For its function as a sack truck according to FIGS. 1 and 2, the multi-purpose hand truck comprises a frame (1) consisting of two parallel side-members (2), which are joined together at the top by an angled handle-bar arrangement (3), in the centre section by the pivot (4) of a support stand (5) and in the lower section by the pivot (6) of a toe plate (7) as well as by the axle (8) of two externally mounted wheels (9). A table top (10) which sits in a recessed position between the two side members (2) can be used as the supporting surface for a load resting on the toe plate. For storage purposes, the toe plate (7) can be folded into the position (7'), as shown in FIG. 4, where it comes into contact with the table top (10).

The support stand (5) which is pivotable about the axis (4) also forms a frame consisting of two legs (11) which are held together at the top end in FIGS. 1 and 2 by a transverse leg (12) while at the two other ends the legs are pivotably attached to the table top (10) and the pivoting axis (13) forms one of the short sides of the table top. As an extension of the opposite shorter edge, the table top (10) possesses two trunnions (14) which engage in grooves (15) on the inner surfaces of the side members of the frame (FIG. 4). In its upper end section each groove (15) curves to the right, and asymptotically turns in the direction dictated by the handle-bar (3) and by the extension of the table top (10) in its ready-for-use position in FIG. 3. Finally, the grooves terminate in downward-angled sections or locking sockets (16).

Figure 3:
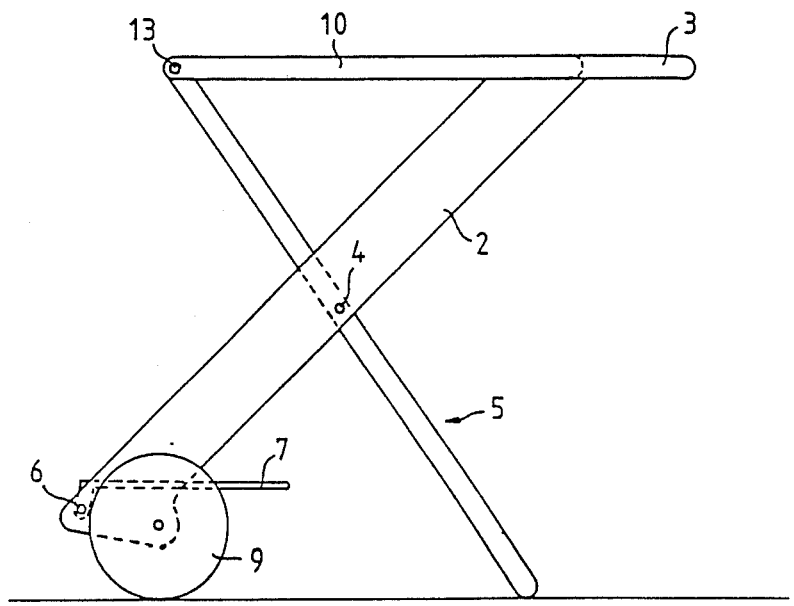
FIG. 3 is a side view of the hand truck shown in FIG. 1, depicted here in the table position.

In order to convert the sack truck into a moveable utility table the handle-bar (3) must be held in one hand and with the other the support stand (5) is gripped by its cross member (12) and pivoted out of the frame (1) until it stands at an angle to the latter. In the process, the trunnions (14) of the table top simultaneously pivot and slide upward in the grooves (15) until the trunnions (14) engage in the locking sockets (16). Then the device is as depicted in FIG. 3. It now rests on the wheels (9) and the support stand (5) and the table top (10) is in a horizontal position and it is extended by the handle-bar (3), which is also in the horizontal position. In order to fold the truck together again, the table top (10) is raised slightly at the edge fitted with the trunnions (14) so that the latter disengage from the locking sockets (16), and then the support stand (5) can be returned to its resting position according to FIG. 1 and the table top also moves back down.

As is shown in particular by FIG. 4, the toe plate (7) has two attachment lugs (17) which place the toe plate at a distance from its pivot axis (6). In the extended, sack-carrying position shown in the drawing, these attachment lugs (17) rest against stops (18) which are firmly located on the side members (2). In the dash-dot outlined position (7") the toe plate extends between the two side members and rests against appropriate stops (19). It is now positioned horizontally with its underside facing upwards (FIG. 3) and can thus be used as an additional storage surface.

What is claimed is:

1. A multi-purpose hand truck which is convertible into a utility table having at least one short side, said hand truck having an elongated frame comprising two joined side members, and having at one end two wheels and a substantially perpendicular toe plate when in use as a hand truck, and having at the other end handle means, a table top and a support stand which are attached to the frame, said support stand being pivotable about a transverse axis arranged at about the half-way point along the frame, such that the support stand can be moved from a position where it is parallel to the side members to a position where it forms a cross shape together with the side members, the frame resting on said two wheels in the crossed position and held together with the support stand at the top by means of the table top which is attached to the support stand by means of pivots whose axes runs parallel to the short side of the table top, and wherein the table top engages the side members by means of round trunnions projecting in grooves provided on the inner surfaces of the side members, and wherein the side members have an upper end which includes the grooves, which run in a direction substantially parallel to an extension of the table top, and have at their ends a short downwardly angled section.

2. A multi-purpose hand truck according to claim 1, characterized in that the toe plate is pivotably mounted in the frame and can be moved backwards through the frame into a position (7") which is parallel to the table top when it is positioned ready for use.

* * * * *